Oct. 13, 1953 W. N. DELENK 2,654,978
ROTARY SURFACE-FINISHING TOOL
Filed Sept. 22, 1951 2 Sheets-Sheet 1

INVENTOR.
WOLFRAM N. DELENK
BY
Oberlin & Limbach
ATTORNEYS.

Oct. 13, 1953       W. N. DELENK       2,654,978
ROTARY SURFACE-FINISHING TOOL
Filed Sept. 22, 1951       2 Sheets-Sheet 2
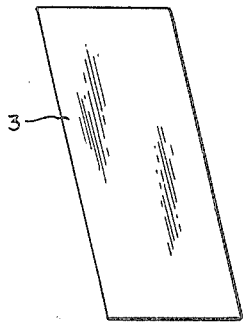
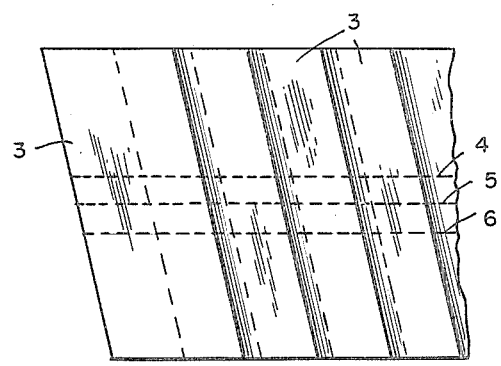
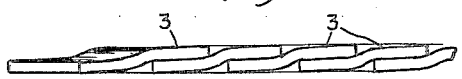
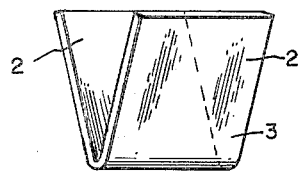
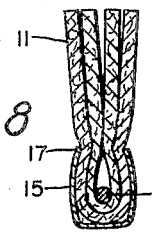
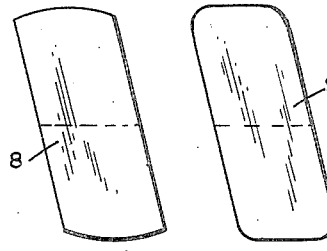
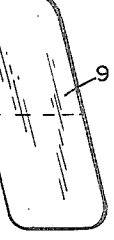
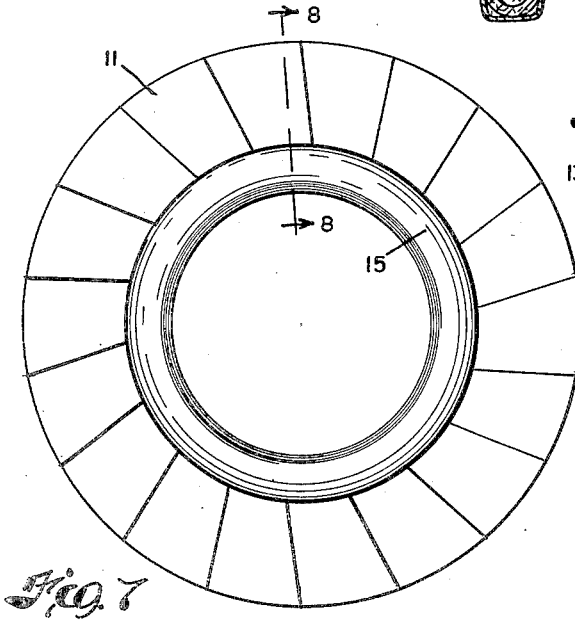
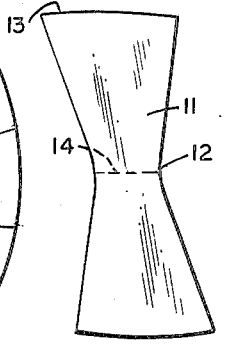
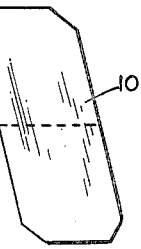
INVENTOR.
WOLFRAM N. DELENK
BY
Oberlin & Limbach
ATTORNEYS.

Patented Oct. 13, 1953

2,654,978

UNITED STATES PATENT OFFICE 2,654,978

ROTARY SURFACE-FINISHING TOOL

Wolfram N. Delenk, Lakewood, Ohio, assignor to The Osborn Manufacturing Company, Cleveland, Ohio, a corporation of Ohio Application September 22, 1951, Serial No. 247,788

14 Claims. (Cl. 51—193)

This invention relates as indicated to a rotary surface-finishing tool, and more particularly to an annular rotary tool employing felt or the like as the work-engaging constituent.

While a wide variety of rotary buffs are known in the art, the most common form consists of a number of layers of annular fabric discs superimposed on one another and stitched or otherwise secured together. Layers of felt have likewise been employed in this same general manner. Such buffs, however, tend to be relatively rigid and fail to yield sufficiently when pressed against the work to enter hollows and irregularities in the surface of the latter. Furthermore, it is necessary to apply abrasive or other surface-finishing compound to the same at very frequent intervals inasmuch as such compound will be carried substantially entirely by the outer work-engaging periphery of the tool and is quickly consumed in use. Furthermore, such layers of felt on occasion have a tendency to cause streaking on the surface of the work-piece. There has also frequently been a tendency for the compact work-engaging faces of such prior art buffs to glaze-over in use with consequent reduction of the cutting qualities. While felt is an excellent buffing material for many purposes, it is however quite expensive, and the usual form of buff tends to be unduly wasteful of material in that a considerable portion will ordinarily be discarded after a certain degree of reduction of the diameter of the same due to wear.

It is accordingly a primary object of my invention to provide a rotary surface-finishing tool having a work-engaging face adapted to yield somewhat when pressed against the work so as better to enter hollows and irregularities in the surface of the latter.

Another object is to provide such tool making efficient use of felt and like buffing material and adapted to hold and apply abrasive and like compounds to the work so efficiently that the supply of such compound need by replenished but infrequently.

A further object is to provide a buffing tool which will be ventilated and cool-running in use and the work-engaging face of which, while being somewhat open, nevertheless is balanced and uniform and relatively wide.

Still another object is to provide such buffing tool which will not tend to streak the work.

Other objects of this invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 3 is a plan view of a parallelogram-shaped buffing element of felt or the like adapted to be folded along its center line to form a pair of offset fingers as shown in Fig. 4;

Fig. 5 is a plan view of a plurality of the Fig. 3 fingers superimposed in overlapping relationship and stitched together to form a continuous chain adapted to be folded along its longitudinal center line when secured in a channelform brush back;

Fig. 6 is an edgewise view of the assembly of Fig. 5;

Fig. 7 is a side elevational view of another modification of my new rotary buffing tool;

Fig. 8 is a transverse section taken on the line 8—8 on Fig. 7;

Figs. 9, 10 and 11 illustrate certain modifications of the element shown in Fig. 3; and Fig. 12 illustrates a modification of such element particularly adapted for employment in rotary buffs of relatively small diameter.

Figure 1:
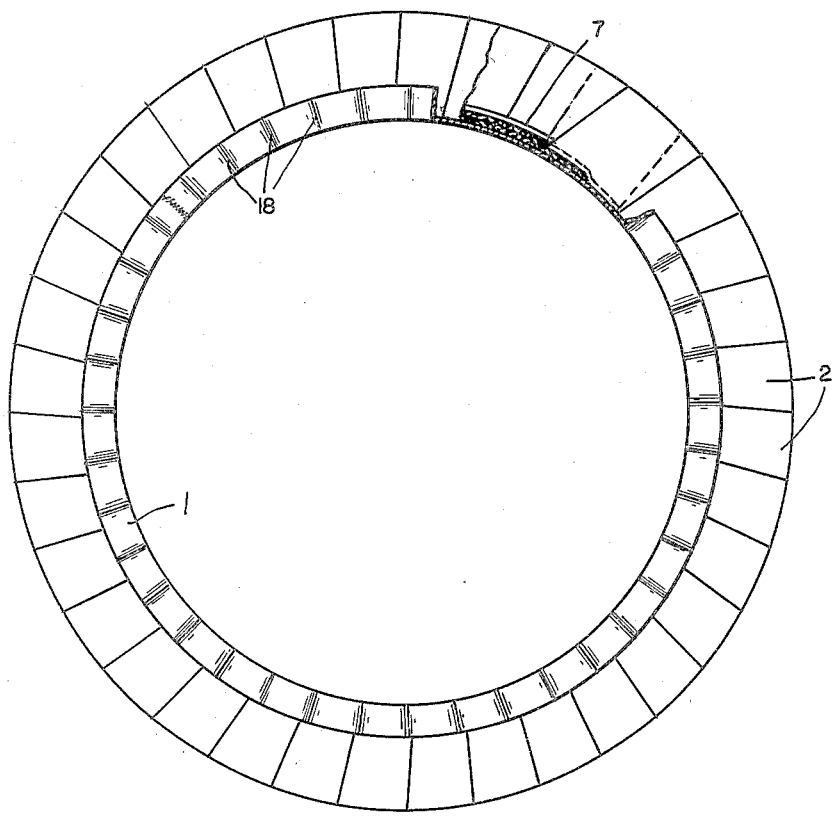
Fig. 1 is a side elevational view of one embodiment of a rotary buffing tool incorporating the principles of my invention, with a local portion broken away better to disclose the internal construction of the same.

Referring now more particularly to said drawing and especially Figs. 1–6 thereof, the embodiment of my invention there illustrated may comprise an annular sheet metal channelform back 1 from which the individual buffing fingers 2 of felt or like material extend. Such fingers comprise the respective end portions of elongated oblique parallelogram-shaped pieces 3 preferably arranged in overlapping relationship as shown in Fig. 5 and stitched together as at 4, 5 and 6 to form a chain. As shown in Figs. 5 and 6, the degree of overlap will desirably be slightly less than one-half the width of the individual elements so that such superimposed elements will form a layer of substantially uniform thickness (see Fig. 6).

Such chain of interconnected buffing elements will be folded along its longitudinal center line and secured within the channel back 1 as by means of wire 7 or a like elongated retaining element. The method of construction disclosed in U. S. Patent No. 2,288,337 to William S. Whittle has proven particularly satisfactory when employing my new buffing elements. As taught in such patent, a second sheet metal channelform element is utilized instead of wire 7, compression of the sides of channel 1 acting likewise to compress the sides of such second channel to cause radially inward shrinkage of the latter firmly to grip the buffing material.

Figure 2:
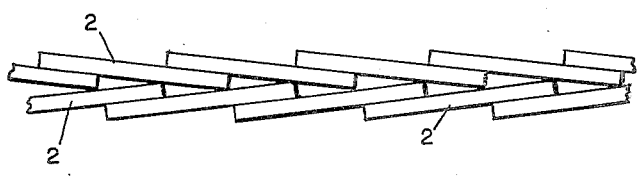
Fig. 2 is an enlarged fragmentary edgewise view of the tool of Fig. 1 illustrating the disposition of the work-engaging ends of the individual buffing fingers.

The felt or like buffing elements 3 when folded as illustrated in Fig. 4 form pairs of offset buffing fingers 2 which when assembled in overlapping relationship as above described serve to afford a work-engaging buff face of uniform width (see Fig. 2). As shown in Fig. 2, there will always be three thicknesses of felt at any designated point along such face. Accordingly, if a plurality of annular sections of the type shown in Fig. 1, for example, are assembled in close side-by-side relationship to form a generally cylindrical buffing tool of considerable axial extent, the entire outer cylindrical surface of such tool will be uniform in density and conformation.

The overlapping of the individual elements 3, moreover, serves to cause the outer ends of the same to arrange themselves slightly angularly to the axis of rotation of the tool thereby both affording V-shaped pockets adapted to receive granular abrasive or other compounds and also avoiding any possibility of streaking of the work surface. If slightly modified elements 8, 9 and 10 are utilized instead of element 3, such other elements having rounded or beveled end contours as shown, a somewhat smoother periphery is afforded in the assembled annular tool without the necessity of subsequently trimming the latter. Such rounded or beveled end contours will accordingly ordinarily be preferred.

Referring now more particularly to Figs. 7, 8 and 12, when an annular buffing tool of quite small diameter is desired utilizing my novel buff material, I prefer to employ buffing elements 11 of the same general type as elements 3, 8, 9 and 10 but cut away to form a reduced waist 12 so that the resultant element is of general oblique hourglass conformation. The outer ends 13 will desirably be slightly rounded similarly to the ends of element 8. When now folded along their transverse center lines 14 in the same manner shown in Fig. 4, the respective end portions of such elements 11 will be similarly offset and the outer periphery of the assembled brush will appear as shown in Fig. 2. Each finger of the pair comprising a single element 11, however, will taper inwardly toward the annular sheet metal channelform back 15, within which it is secured by elongated retaining element 16, so that the density of the buffing material will be substantially uniform from such back radially outwardly to the outer periphery of the tool. A sufficiently dense outer working surface is thereby obtainable without undue crowding of the material in the back 15. Channelform back 15 may desirably be provided with a somewhat constricted pressure neck 17 to assist in securing the buffing material in place in cooperation with retaining element 16.

The brush back may further be provided with a number of radially extending crimps or flutes 18 which both assist in preventing any shifting of the buffing material longitudinally of the back and also facilitate radial flow of air between adjacent sections for ventilating purposes. In this latter connection, it will be noted that the staggered overlapping arrangement of the buffing fingers 2 as best shown in Fig. 2 greatly facilitates such outward flow of air. Fine granular abrasive or other materials may be entrained in such air, being fed centrally of the tool for application to the work-piece by the latter.

The present invention resides primarily in the conformation and arrangement of the felt or like buffing elements, and it will readily be appreciated that such elements may be mounted in a variety of backs or equivalent supports. Thus, for example, a chain of such buffing elements as shown in Fig. 5 may be continuously assembled into a sheet metal brush back in the general manner described in U. S. Patent No. 2,303,386 to R. O. Peterson and the resultant buff strip utilized in either straight or, more usually, annular or helical form. Instead of stitching the individual elements together as shown in Fig. 5, they may of course be interconnected in various other ways as by means of adhesive or stapling. While felt is a preferred material for many purposes, I may also utilize elements of the indicated configurations died from other fabrics such as cloth, the individual elements in such cases usually comprising a plurality of layers stitched together or bonded together with an appropriate adhesive. Granular abrasive such as emery, pumice, Alundum, etc., may be adhered to the surfaces of the buffing fingers, preferably only near the outer ends of the same, and incorporated between the several layers of fabric which may be utilized in the formation of such elements.

If the buffing elements employed are not cut to an oblique pattern or disposed diagonally of the brush back during assembly as taught above, certain of the advantages of my invention are nevertheless obtained if such elements are arranged in overlapping relationship similar to that shown in Fig. 5, the width of the resultant buff face being four layers of such elements instead of three. For use in the smaller diameters of buffs such elements may also desirably be of erect hourglass form (in effect two isosceles triangles joined at their apices) to obtain the proper density of fill.

It will be readily appreciated that strips of buff material of other than oblique parallelogram shape may be utilized if folded and secured diagonally of the back (see Fig. 4) but in such case it will ordinarily be necessary to trim the periphery of the finished buff whereupon each such strip will then assume such oblique parallelogram shape. This may be wasteful of valuable material such as felt. The overlapping assemblage of buffing elements shown in Fig. 5 may, if desired, be stapled or otherwise secured to a fibre hub or disc but I generally prefer to employ a channelform back with the channel opening radially outwardly and a wire or like retaining element therein since such construction is both very strong and quick and inexpensive of manufacture. The buffing fingers extending from the back are individually flexible to a considerable degree, permitting the rotating buff face to yield more or less resiliently when brought into engagement with the work, but the nesting of one side edge of each finger between two adjacent fingers (Fig. 2) controls such action and maintains the uniform arrangement of the finger ends forming such face.

Other modes of applying the principle of the invention may be employed, change being made as regards the details described, provided the features stated in any of the following claims or the equivalent of such be employed.

I therefore particularly point out and distinctly claim as my invention:

1. A rotary buff comprising an annular sheet metal channelform back opening radially outwardly, an elongated retaining element within such channel extending circumferentially within said channelform back, and buffing material doubled about said element within such channel with end portions extending generally radially to form the buff face, said material comprising a plurality of felt strips of oblique parallelogram shape arranged in uniform overlapping relationship and doubled about said element with the respective opposite end portions of each said strip offset circumferentially of the buff, thereby forming a peripheral buff face of overlapping strip ends angularly disposed relative to the plane of the buff.

2. A rotary buff comprising an annular sheet metal channelform back opening radially outwardly, an elongated retaining element extending circumferentially within such channel, and buffing material doubled about said element within such channel with end portions extending generally radially to form the buff face, said material comprising a plurality of felt strips of oblique parallelogram shape arranged in uniform, aligned, overlapping relationship and doubled about said element along a central line parallel to their ends with the respective opposite end portions of each said strip offset circumferentially of the buff, thereby forming a peripheral buff face of overlapping strip ends angularly disposed relative to the plane of the buff and with a uniform amount of material transversely of such face at all points about the latter's periphery.

3. A rotary buff comprising an annular sheet metal channelform back opening radially outwardly, an elongated retaining element extending circumferentially within such channel, and buffing material doubled about said element within such channel with end portions extending generally radially to form the buff face, said material comprising a plurality of flat strips of buff material of general oblique parallelogram shape arranged in uniform, aligned, overlapping relationship and doubled about said element along a central line parallel to their ends so that the respective end portions of each said strip extend non-radially from said back to opposite sides of a radial line, thereby forming a peripheral buff face of overlapping strip ends angularly disposed relative to the plane of the buff, with one edge of each strip nesting between two adjacent strips.

4. A rotary buff comprising a circular back having a peripheral channel therein opening radially outwardly, an elongated circumferentially extending retaining element secured within such channel, and buffing material doubled about said element and retained in such channel thereby with end portions extending therefrom, said material comprising a plurality of like flat strips of buff material of general oblique parallelogram shape arranged in uniform, aligned, overlapping relationship and thus doubled about said element along a central line parallel to their ends so that the respective end portions of each said strip extend from said back in the general plane of the latter but oppositely inclined to a radial line passing through such strip in the region of doubling to form a buff face having a uniform transverse thickness of three layers of said strips.

5. A rotary buff comprising a circular back having a peripheral channel therein opening radially outwardly, an elongated circumferentially extending retaining element secured within such channel, and buffing material doubled about said element and retained in such channel thereby with end portions extending therefrom, said material comprising a plurality of like flat strips of buff material of general oblique parallelogram shape arranged in uniform, aligned, overlapping relationship and thus doubled about said element along a central line parallel to their ends so that the respective end portions of each said strip extend from said back in the general plane of the latter but oppositely inclined to a radial line passing through such strip in the region of doubling, the corners of each said parallelogram strip being beveled.

6. A rotary buff comprising a circular back having a peripheral channel therein opening radially outwardly, an elongated circumferentially extending retaining element secured within such channel, and buffing material doubled about said element and retained in such channel thereby with end portions extending therefrom, said material comprising a plurality of like flat strips of buff material of general oblique hourglass shape arranged in uniform overlapping relationship and thus doubled about said element along a central line parallel to their ends so that the respective end portions of each said strip extend from said back in the general plane of the latter but oppositely inclined to a radial line passing through such strip in the region of doubling to form a buff face having a uniform thickness of three layers of said strips and to afford a density of fill generally uniform in all regions radially outwardly of said back.

7. A rotary buff comprising a circular back having a peripheral channel therein opening radially outwardly, an elongated circumferentially extending retaining element secured within such channel, and buffing material doubled about said element and retained in such channel thereby with end portions extending therefrom, said material comprising a plurality of like flat strips of buff material of general hourglass shape doubled about said element in their narrow waist regions with their end portions extending generally radially of said circular back to afford a density of fill generally uniform in all regions radially outwardly of said back.

8. A rotary buff comprising a rotatable support and buffing fingers secured thereto and extending generally radially therefrom, said fingers comprising a plurality of like strips of buff material of general oblique parallelogram shape arranged in uniform, aligned, overlapping relationship and secured to said support on a central line parallel to their ends with the respective end portions of each said strip extending from said support in circumferentially offset relationship to form a uniformly wide buff face of nesting strip ends angularly disposed to the general plane of the buff.

9. A rotary buff comprising a rotatable support and buffing fingers secured thereto and extending generally radially therefrom, said fingers comprising a plurality of like strips of buff material of general oblique parallelogram shape arranged in uniform, aligned, overlapping relationship and secured to said support on a central line parallel to their ends with the respective end portions of each said strip extending from said support in circumferentially offset relationship.

10. A buff element comprising an elongated support and generally flat buffing fingers secured thereto and extending therefrom, said flat fingers being disposed diagonally of said support and folded at their mid points and there secured to said support to bring the respective end portions of each said finger into generally side-by-side relationship but offset longitudinally of said support.

11. A buff element comprising an elongated support and buffing fingers secured thereto and extending therefrom, said fingers comprising a series of overlapping strips of buff material disposed diagonally of said support and secured thereto midway between their ends, said strips being folded in the region where thus secured to bring their end portions into side-by-side relationship to form a buff face of nesting ends inclined at an angle to the general plane of said buff element.

12. A buff element comprising a support and buffing fingers secured thereto and extending therefrom, said fingers comprising a series of individual overlapping diagonal strips of buff material secured to said support midway between their ends, said strips overlapping throughout their length and being folded in the region where thus secured to bring their end portions into side-by-side relationship to form a buff face of nesting ends inclined at an angle to the general plane of said buff element.

13. A buff element comprising a rotatable support and buffing fingers secured thereto and extending generally radially therefrom, said fingers comprising a plurality of like strips of buff material of general hourglass shape arranged in uniform, aligned overlapping relationship diagonally of said support and folded to bring the respective end portions of said fingers into generally side-by-side relationship but offset circumferentially of said support.

14. A buff element comprising an elongated support and generally flat buffing fingers secured thereto and extending therefrom, adjacent fingers being overlapped side-by-side and joined together in the central regions of such overlap to form an interconnected chain with said fingers extending diagonally of the longitudinal center line of such chain, and said chain of fingers being folded along such longitudinal center line to bring the opposite ends of said fingers into generally side-by-side relationship with the respective ends of each individual finger accordingly being offset longitudinally of said support relative to each other as a result of such diagonal disposition of the same.

WOLFRAM N. DELENK.

References Cited in the file of this patent

UNITED STATES PATENTS

| Number | Name | Date |
|---|---|---|
| 709,312 | Farnham | Sept. 16, 1902 |
| 968,431 | Stevens | Aug. 23, 1910 |
| 981,841 | Codman et al. | Jan. 17, 1911 |
| 1,152,180 | Jarvis | Aug. 31, 1915 |
| 1,441,936 | McGinnis et al. | Jan. 9, 1923 |
| 1,595,089 | Hall | Aug. 10, 1926 |
| 1,669,224 | Yerges | May 8, 1928 |
| 2,209,089 | Peterson et al. | July 23, 1940 |
| 2,226,625 | MacFarland et al. | Dec. 31, 1940 |
| 2,489,193 | Mockiewicz | Nov. 22, 1949 |